(12) United States Patent
Seignol et al.

(10) Patent No.: US 6,826,417 B2
(45) Date of Patent: Nov. 30, 2004

(54) PROCESS FOR SENDING IMAGES TO A LOW DISPLAY ABILITY TERMINAL

(75) Inventors: Olivier Seignol, Champs sur Marne (FR); Eric Masera, Paris (FR); Jean-Marie Vau, Paris (FR)

(73) Assignee: Eastman Kodak Company, Rochester, NY (US)

( * ) Notice: Subject to any disclaimer, the term of this patent is extended or adjusted under 35 U.S.C. 154(b) by 561 days.

(21) Appl. No.: 09/993,743

(22) Filed: Nov. 16, 2001

(65) Prior Publication Data

US 2002/0065088 A1 May 30, 2002

(30) Foreign Application Priority Data

Nov. 29, 2000 (FR) .............................................. 00 15383

(51) Int. Cl.$^7$ ................................................. H04M 1/00
(52) U.S. Cl. ..................................... 455/566; 382/173
(58) Field of Search ................................. 382/298, 190, 382/176, 173, 177, 260, 299, 229; 455/285, 302, 158.5, 466; 375/216, 241; 345/672, 689, 467

(56) References Cited

U.S. PATENT DOCUMENTS

| | | | |
|---|---|---|---|
| 4,996,707 A | | 2/1991 | O'Malley et al. |
| 5,825,999 A | * | 10/1998 | Uzaki et al. ................ 345/467 |
| 6,044,178 A | * | 3/2000 | Lin ............................. 382/260 |

* cited by examiner

*Primary Examiner*—Nick Corsaro
*Assistant Examiner*—Tu X. Nguyen
(74) *Attorney, Agent, or Firm*—David A. Novais

(57) ABSTRACT

A method to transmit drawings or images comprising text to low display ability terminals, and more particularly to cellular phones or equivalent mobile devices. The transmission is possible in the best conditions and automatically. The transmission enables the consultation or display by the user of these drawings or images comprising text, on a low display ability terminal. These images can have the form of a plate of several images or an individual image comprising text. This operation is possible by automatically transforming the drawings or images via image analysis into image entities formed by an image zone and a text zone; and without requiring any extra work by the publisher or author of the drawings or images comprising text.

7 Claims, 3 Drawing Sheets

PROCESS FOR SENDING IMAGES TO A LOW DISPLAY ABILITY TERMINAL

FIELD OF THE INVENTION

The present invention relates to the transmission of images or drawings to low display ability terminals, and more particularly to cellular phones.

BACKGROUND OF THE INVENTION

Electronic data exchanges using the Internet are multiplying under varied forms, via digital terminals for displaying these messages. It is possible for instance to transmit data including drawings or images using a means which operates with the WAP (Wireless Application Protocol), SMS (Short Messaging Service) or other means for these data exchanges. In this way it is possible for instance to send parents and/or friends having mobile phone type terminals equipped with a display screen, humorous drawings accompanied with text messages adapted to the humor or to the needs of the moment, who receive them on a terminal (e.g. Fun Mail service presented on the web at the Internet universal resource locator http://www.wapland.com/art/375.html). However, the presentation of drawings or images comprising text having a large number of characters remains a problem on the screens of low display ability terminals and especially mobile phone screens. The terminals generally used do not permit the display of drawings or images in satisfactory conditions, and for the smallest of the terminals, for instance cellular phones, which are also the most numerous, the text is not sufficiently legible to the user.

It is therefore necessary to be able to send data including drawings, images or extracts of plates of drawings or images together with text, to terminals with low definition screens, and in good condition, i.e., by keeping a good image quality and without generating additional cumbersome manipulations for the sender.

SUMMARY OF THE INVENTION

The process according to the invention enables this problem to be remedied. The invention relates to a transmission process which comprises transmitting data to low display ability terminals. The data comprises images that include an image frame and at least one text zone inside the image frame. The process enables the selection and sending of this data in the form of isolated drawings or images, or strips of drawings or images (for example "comic strip" type images, possibly accompanied by the desired text, to these low display ability terminals.

The terminals can themselves be relays for sending the data to other low display ability terminals. The process according to the invention enables the sending of the images while maintaining a good display quality for the user on the terminals of, for example, mobile cellular phones or PDA (Personal Digital Assistant) type terminals. This sending is performed without having to redefine or redraw the image manually, or the plate of images, while obtaining a good image quality on display. The process according to the invention enables the text to be removed from the image by making an automatic extraction of the text that would not be legible in its initial version in graphic mode on a low display ability screen. Then, the terminal's resources are used to produce the image display and the text display in text mode.

The process according to the invention relates to the transmission of data comprising one or more image entities.

An image entity is defined by two zones: one image zone comprises the drawing or image to be sent and a text zone intended to receive one or more alphanumeric character strings corresponding to the one or more character strings of the original image. Based on a user request, the process according to the invention enables the automatic transmission to a low display ability terminal, of an image entity comprising at least one text zone, the process comprises the following steps:

searching for the text zones inside the frame of the original image;

recognizing each individual text zone;

assigning to each individual text zone a unique identifier;

replacing in the original image each character string by its related unique identifier to obtain a modified image; and joining in an image entity the modified image and each character string preceded by its unique identifier forming a text zone in a presentation in which the text zone is located outside the frame of the modified image, to be able to display the modified image with a first enlargement coefficient and the text zones with at least one enlargement coefficient different than that used for the modified image.

The process according to the invention also enables the automatic transmission of data comprising several original images of which at least one of them is together with a text contained inside its image frame. The data is cut into as many individual image frames as there are original images and the steps of the process mentioned just above are applied, with the steps concerning the automatic transmission of the data coming from an original image.

The present invention therefore relates to a method of automatically transmitting images to a low display ability terminal, with at least one of the images comprising at least one text zone having a character string. The method comprises the steps of: searching for text zones inside an image frame of an original image; recognizing each individual text zone comprising a single character string; assigning to each individual text zone a unique identifier; replacing each character string in the original image by its related unique identifier to obtain a modified image; and joining in an image entity the modified image and each character string preceded by its unique identifier forming a text zone in a presentation, wherein the text zone is located outside a further frame of the modified image, such that the modified image is displayed with a first enlargement coefficient and the text zones are displayed with at least one second enlargement coefficient different than that used for the modified image.

BRIEF DESCRIPTION OF THE DRAWINGS

Other characteristics and advantages of the invention will appear on reading the description that follows, with reference in particular to the drawings that illustrate the invention.

DETAILED DESCRIPTION OF THE INVENTION

Figure 5:
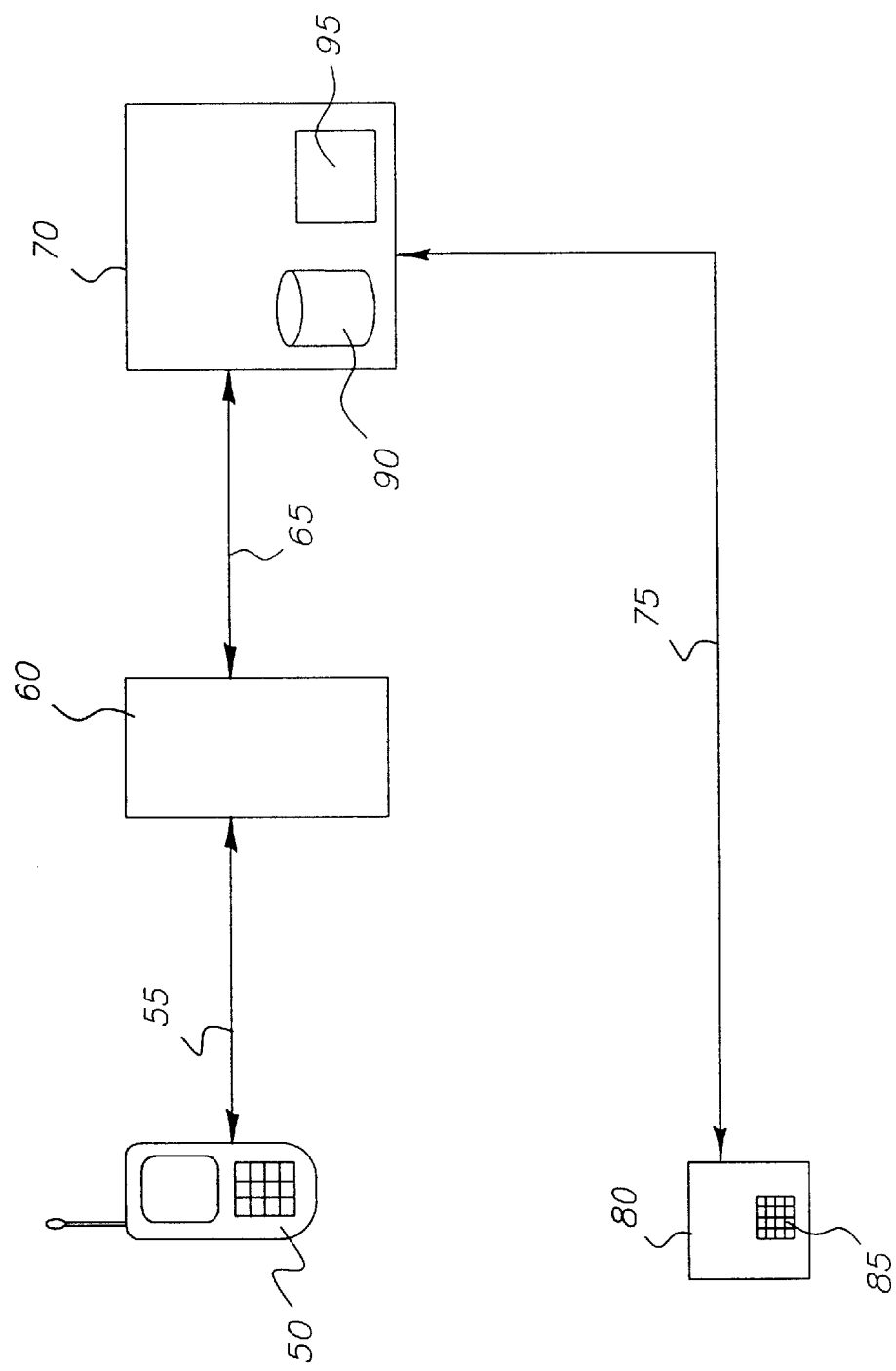
FIG. 5 represents diagrammatically examples of electronic data exchanges.

The present invention is useful for instance to a user of a low display ability terminal 50, 80, as shown in FIG. 5, who wants to receive data stored in a storage unit 90 of a server 70; this data being in the form of drawings or images together with text. The terminal 50 is for example a mobile phone and the terminal 80 is for example a PDA (Personal Digital Assistant) or another wireless Internet devices that supports http. Line 55 represents a WAP protocol line and lines 65, 75 represent http lines. In FIG. 5, a conventional mode of use of the WAP standard is represented by the lines 55 and 65 via a WAP gateway 60. That enables the sending and reception of the data; the user can for instance be notified by an SMS message that certain image (s) or drawing (s) broadcast by a daily paper is (are) available. The user can then find and recover on his terminal the drawing (s) or image (s) by making a request via a universal resource locator (URL) that he knows of the type http://wap . . . in the Internet. FIG. 5 also represents a direct exchange between the server 70 and other devices which are terminals such as 80 with low definition screens. The user can also subscribe to be part of a list of subscribers to a special service that routinely broadcasts, for instance daily, this type of message, to be able to recover the drawing (s) or image (s) on his terminal directly through the network, via an SMS and a special application, and without passing by the Internet.

In concrete terms, there are now already services that enable the recovery of drawings by e-mail. However, current terminals do not enable the display of all the drawings of a plate in satisfactory display conditions for the user, and for the smallest terminals that are also the most numerous, like for instance cellular phones, the text contained in these drawings or images is almost illegible, even if these drawings or images were clear.

The process according to the present invention makes possible in the best conditions the consultation or display of these drawings or images on low display ability terminals by transforming them by image analysis, and without requiring any extra work by the publisher, or the author of the original drawings, images or plates of drawings or images. The originals are automatically transcribed into a format accessible by a low display ability terminal, like for instance a mobile terminal of cellular phone type.

Figure 1:
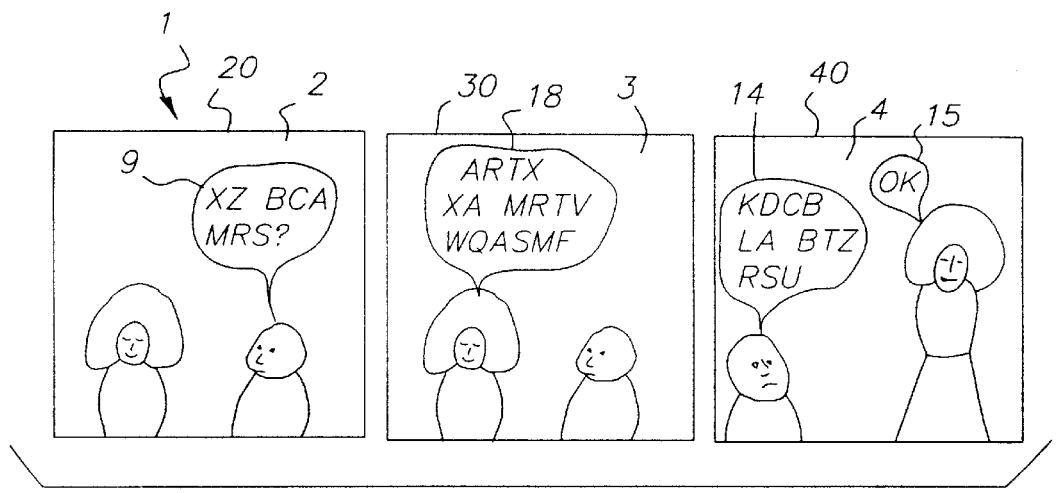
FIG. 1 represents diagrammatically a strip of images comprising text.

The process according to the invention is illustrated by referring first to FIG. 1 which illustrates a strip 1 of a set of drawings or images 2, 3, 4 forming part of a comic strip, representing for instance talking characters. The strip of drawings 1 can be accessed in file form in a storage unit that can be a hard disk, an optical scanner output, etc. The files are image files, e.g. JPEG, TIFF, or BMP, meeting the standards of digital encoding and image compression that enable the exchange of black and white images and color images. In a first embodiment, a user's terminal 50, 80 (FIG. 5) being linked, through the Internet, to server 70 holding or storing these files, chooses or selects the data, i.e. one or more drawings, images comprising text, or strips of drawings or images comprising text, from among all the stored digital drawing or image files. In other embodiments, the choice of data can be made for instance on a WEB site from a low display ability terminal; this choice can also for instance be made on the basis of a routine daily data transmission, for which the user will be notified of the receipt of this data on his/her terminal by an SMS received via WAP. The user can then send the data, as required, via WAP, to another user of a low display ability mobile terminal.

Figure 2A:
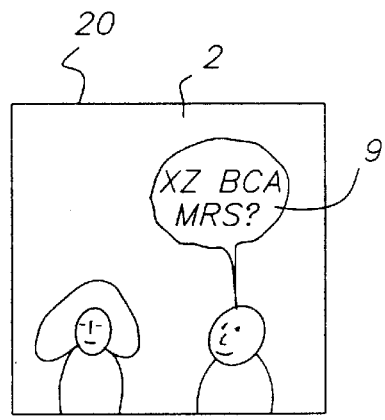
FIGS. 2A–2D represents diagrammatically the processing to modify a first image of the initial strip.
Figure 2B:
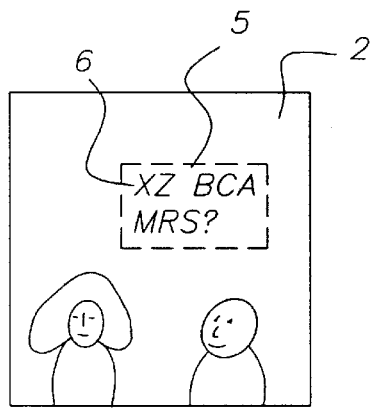

The set of one or more drawings or images comprising text is for instance a page of a comic strip. This set can also be a subset of images chosen from a page of a comic strip. According to the process of the invention, on the basis of a strip of "n" images (images separated from a set of images of the same type coming from a comic strip), represented for instance by three images 2, 3, 4 (n=3) on the drawing of FIG. 1, using the image analysis principle in order to put them on a low display ability screen, strip 1 is cut or separated into individual images 2, 3, 4. The process of the invention runs into the server 70, when the images or images with text stored in the storage unit 90 are requested. The cutting or separation is performed according to an image analysis algorithm enabling optimum definition, according to the terminal used, of the frame 20, 30, 40 of each of the images 2, 3, 4, making up the strip of "n" images, while respecting the characteristics of each of the individual images making up the strip, especially the image background. For instance, for the cutting, the geodesic outline method can be used. In a preferred embodiment, after cutting, the text located in each of the cut images comprising text, e.g. 9 for the image 2 in FIG. 2A, is searched for and extracted using on the one hand a first algorithm enabling the detection of the density of points on the analyzed image, and on the other hand a second algorithm of optical character recognition enabling the determination of the rectangle 5 of said image 2 (FIG. 2B) enclosing the text in order to recognize the zone outlined by this rectangle as a string of alphanumeric characters 6 that can include all the signs present in various languages, including punctuation. The text contained in the images must be written in a font style recognized by the character recognition engine.

In another embodiment, the steps of searching, extraction and recognition can be done at the same time with a single algorithm, but according to the preferred embodiment described just above, it is preferable to search for and extract, i.e. to isolate a text zone firstly and then to recognize the isolated text secondly; this enables the robustness of the method to be improved as well as the overall calculation time. Of course, searching, extraction and character recognition is applied to each text zone extracted, e.g. 9 on the image 2, and this is done for each of the "n" images 2, 3, 4 of the strip.

Figure 2C:
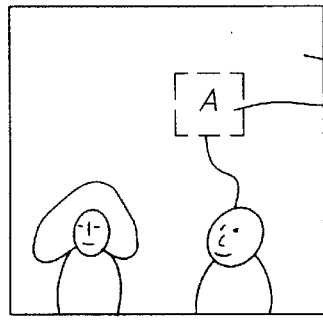
Figure 2D:
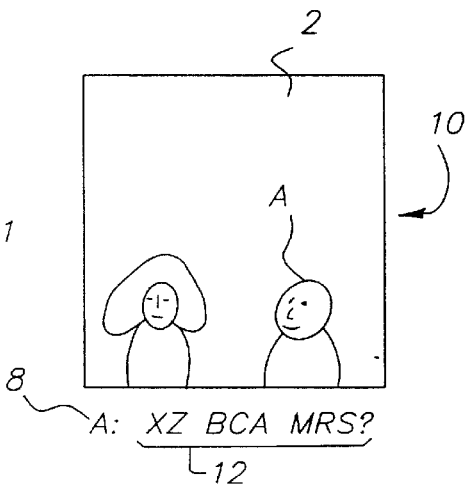

An assignment algorithm enables the replacement of the contents of each text zone of each original image by one or more identifiers for instance single character type: "A" for the first text zone of the first image, "B" for the second text zone of the same first image, "A" for the first and only text zone of the second image, "A" for the first text zone of the third image, "B" for the second text zone of the third image, etc. In the illustration of the drawings of FIGS. 2A–2D, the contents of the only text zone 9 of the image 2 is replaced by a unique identifier A (FIG. 2C). The assignment is thus made up to the "nth" image. The set formed by the image 2 plus its identifier A makes up an image zone corresponding to the modified image 11.

The assignment algorithm enables to display on the screens of terminals 50, 80 with low display ability, the modified image 11 with a given image enlargment coefficient. This enlargment coefficient is a function of the image analysis algorithm and allows to fit the image frame 20, 30, 40 according to the screen of the terminal 50, 80, wherein the request is done. The enlargment coefficient is defined by the geometrical ratio between the size of the modified image 11 displayed on the screen of said terminal 50, 80 and the size of the corresponding original image 2, 3, 4. By analogy, the ratio between the displayed characters 12 on the screen of said terminal and the size of characters in the text 9, 8, 14, 15 of the original image 2, 3, 4 represents the enlargment coefficient of the text zone. These respective enlargment coefficients concerning the image and the text are equal or different, according to the terminal 50, 80 used and according to the content of said image and said text.

Figure 3:
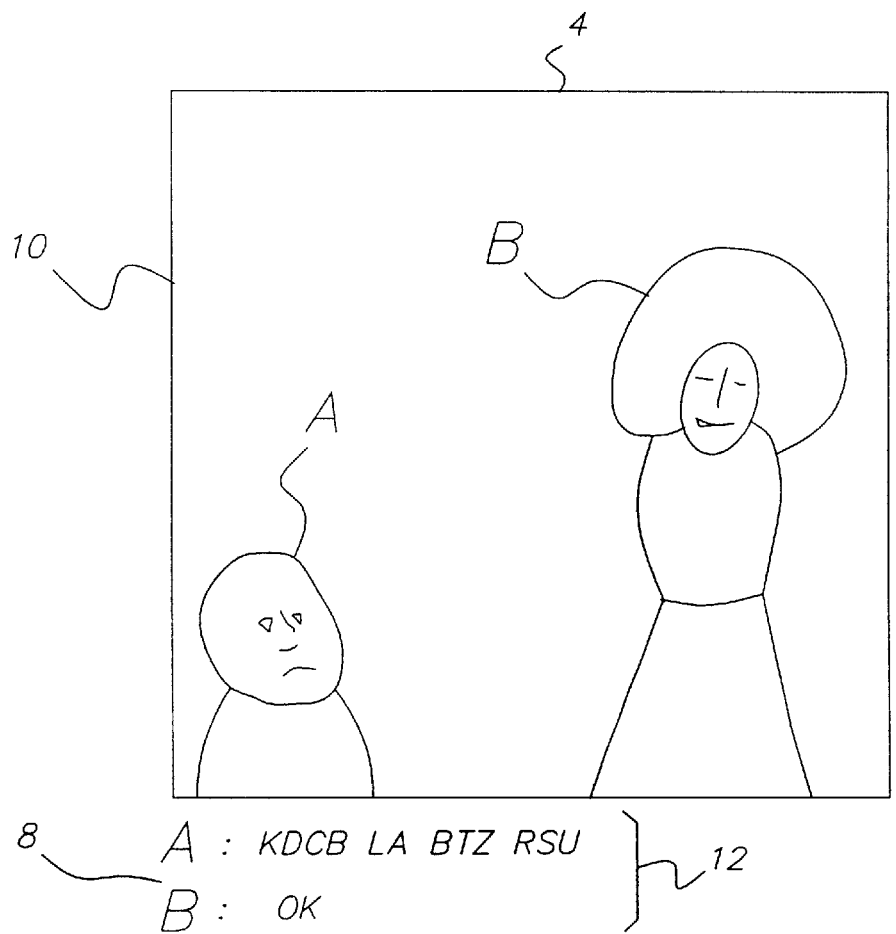
FIG. 3 represents diagrammatically a second modified image of the same initial strip.
Figure 4:
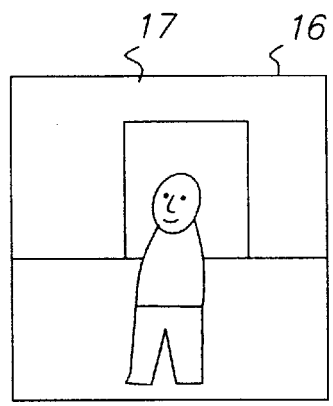
FIG. 4 represents diagrammatically an image not comprising text.

In a preferred embodiment, the background color 7 (FIG. 2C) used behind the identifier A will be for instance a light color if the background color of the image 2 is dark and in reverse the background color 7 used behind the identifier A will be dark if the background color of the image 2 is light. Available now are modified images 11 and as many character strings 12 in text mode forming a text zone 8, and per image; the text zone 8 per image comprises as many character strings 12 FIG. 2D) as there are identifiers in the image or modified image zone 11. In the illustration of the drawing of FIG. 2D, the character string 12, written in text mode, corresponds to the identifier A of the initial text 9. In the illustration of the drawing of FIG. 3, the character string 12, written in text mode, corresponds to the identifiers A and B of the initial texts 14 and 15. For each analyzed image, the joining of each text zone 8 with each corresponding image zone 11 makes up an image entity 10. These previously chosen image entities 10 can then be sent to low display ability terminals (Flow). In a preferred embodiment, the text zone 8 formed by the character strings 12 is located below the image zone 11, in compliance with FIGS. 2A–2D and 3 of the drawings. However, it is also quite possible to have the text zone 8 above the image zone 11, or even in any other less conventional position in relation to the image zone 11.

In a more developed embodiment, advantageously the text of each image can be replaced or accompanied by a voice synthesis system by having a text-speech synthesizer on the server side or on the client side if the user client of the terminal has him/herself a synthesizer. If the synthesizer 95 is on the server side, the application enables the sending of the set of sound, image and text files to the low display ability terminal; if the client has a text-speech synthesizer module 85, the application enables the sending of image and text files to the low display ability terminal 80, and then the voice synthesis is performed on the terminal. It also enables a specific voice timbre to be obtained for each character string recognized on an image and assigned with a unique identifier.

In another embodiment, the text can be translated for instance manually, using the character string of the original language, into the language of the terminal user; the translation can be done for instance from a message transmitted by the user from his/her terminal, to the server; or again the translation into the user's language is automatically allowed for when subscribing to the relevant service, and the data will be sent in the language chosen on subscribing.

The invention has been described in detail with particular reference to certain preferred embodiments thereof, but it will be understood that variations and modifications can be effected within the spirit and scope of the invention.

What is claimed is:

1. A method of automatically transmitting images to a low display ability terminal, at least one of the images comprising at least one text zone having a character string, the method comprising the steps of:

searching for text zones inside an image frame of an original image;

recognizing each individual text zone comprising a single character string;

assigning to each individual text zone a unique identifier;

replacing each character string in the original image by its related unique identifier to obtain a modified image; and joining in an image entity the modified image and each character string preceded by its unique identifier forming a text zone in a presentation, wherein the text zone is located outside a further frame of the modified image, such that the modified image is displayed with a first enlargement coefficient and the text zones are displayed with at least one second enlargement coefficient different than that used for the modified image.

2. A method according to claim 1, wherein each character string preceded by its unique identifier and forming the text zone is located below the further frame occupied by the modified image.

3. A method according to claim 1, wherein each character string preceded by its unique identifier and forming the text zone is located above the further frame occupied by the modified image.

4. A method according to any of claim 1, wherein one character recognition is performed for each individual text zone.

5. A method according to claim 4, wherein each character string is submitted to a voice or analogue synthesis system, to transform each character string into an understandable voice message.

6. A method according to any of claim 1, wherein before integrating each character string into the image entity, each character string is translated into a language different than the language used in the original image.

7. A method according to claim 1, wherein each character string preceded by its unique identifier and forming the text zone is replaced by a voice or analogue synthesis message.

* * * * *